US009830027B2

United States Patent
Li

(10) Patent No.: US 9,830,027 B2
(45) Date of Patent: Nov. 28, 2017

(54) TOUCH DISPLAY PANEL, METHOD FOR DETERMINING TOUCH POSITION AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Cheng Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 54 days.

(21) Appl. No.: 14/347,907

(22) PCT Filed: Jun. 26, 2013

(86) PCT No.: PCT/CN2013/077948
§ 371 (c)(1),
(2) Date: Mar. 27, 2014

(87) PCT Pub. No.: WO2014/153880
PCT Pub. Date: Oct. 2, 2014

(65) Prior Publication Data
US 2015/0205403 A1 Jul. 23, 2015

(30) Foreign Application Priority Data
Mar. 29, 2013 (CN) .......................... 2013 1 0109172

(51) Int. Cl.
G06F 3/044 (2006.01)
G06F 3/041 (2006.01)
G06F 3/047 (2006.01)

(52) U.S. Cl.
CPC .............. *G06F 3/044* (2013.01); *G06F 3/047* (2013.01); *G06F 3/0412* (2013.01); *G06F 2203/04112* (2013.01)

(58) Field of Classification Search
CPC ................................ G06F 3/041–3/047; G06F 2203/04101–2203/04113
(Continued)

(56) References Cited

U.S. PATENT DOCUMENTS

2004/0150629 A1* 8/2004 Lee ................................ 345/173
2009/0058826 A1* 3/2009 Lee et al. ...................... 345/173
(Continued)

FOREIGN PATENT DOCUMENTS

CN 102768604 A 11/2012
CN 203217539 A 9/2013

OTHER PUBLICATIONS

International Search Report dated Dec. 29, 2013; PCT/CN2013/077948.
(Continued)

*Primary Examiner* — Stephen Sherman
(74) *Attorney, Agent, or Firm* — Ladas & Parry LLP; Loren K. Thompson

(57) ABSTRACT

Embodiments of the invention disclose a touch display panel, a method for determining touch position and a display device. The touch display panel includes a TFT array substrate having gate lines and an opposite substrate having a black matrix. At least one of the gate lines is used as a touch scanning line, at least one touch sensing line is provided on the black matrix of the opposite substrate, and a touch capacitor is formed at an intersection between the touch scanning line and the touch sensing line.

17 Claims, 2 Drawing Sheets

(58) Field of Classification Search
USPC .......... 345/173–178, 104; 178/18.01–18.09, 178/18.11
See application file for complete search history.

(56) References Cited

U.S. PATENT DOCUMENTS

| | | | |
|---|---|---|---|
| 2009/0135158 A1* | 5/2009 | Takahashi | G06F 3/044 345/174 |
| 2010/0103121 A1* | 4/2010 | Kim | G06F 3/044 345/173 |
| 2014/0078420 A1* | 3/2014 | Liu | G06F 3/0412 349/12 |
| 2014/0111471 A1 | 4/2014 | Zhao | |

OTHER PUBLICATIONS

International Preliminary Report on Patentability Appln. No. PCT/CN2013/077948; dated Sep. 29, 2015.
First Chinese Office Action dated Jun. 23, 2016; Appln. No. 201310109172.8
Second Chinese Office Action dated Feb. 17, 2017; Appln. No. 201310109172.8.

* cited by examiner

TOUCH DISPLAY PANEL, METHOD FOR DETERMINING TOUCH POSITION AND DISPLAY DEVICE

TECHNICAL FIELD

Embodiments of the invention relate to a touch display panel, a method for determining touch position and a display device

BACKGROUND

With the development of smart mobile terminal, the smart mobile terminal with touch function becomes popular more and more. Currently, the touch function of a display device is achieved mainly in two modes of "add on" and "on cell". The "add on" mode indicates attaching a separate touch panel onto a display panel to form the display device having both the display function and the touch function. The "on cell" mode indicates embedding a component achieving the touch function between a color filter substrate and a polarizer provided on a back side of the color filter substrate. However, both modes need an external function module to achieve the touch function or require a post processing. Therefore, the mobile terminal having the touch function fabricated in the above two modes does not have advantages in either fabrication cost or fabrication efficiency.

Recently, another "in cell" mode is proposed, in which the touch function module is integrated onto a thin film transistor (TFT) array substrate. In this way, the integration degree of the display device having the touch function can be improved. The "in cell" mode indicates embedding the component achieving the touch function into pixels of the display device. For example, the basic principle of the "in cell" mode is as follows: a scanning line for touch (i.e., a touch scanning line) is added on the TFT array substrate, and a periodical scanning signal is applied on the touch scanning line; a touch sensing line is formed in the black matrix on a color film (CF) substrate, the touch sensing line and the above-mentioned touch scanning line are perpendicular to each other; a touch capacitor is formed on the touch scanning line on the TFT array substrate, and the scanning signal is transmitted to the touch sensing line by the touch capacitor to determine the position where touch occurs.

However, in the "in cell" mode, the touch scanning line is specially added to the TFT array and occupies a relatively large space, which is unfavorable to improve the aperture ratio. In addition, the touch sensing line is fabricated by the black matrix with conductivity. Since the black matrix is integrally formed on the CF substrate, interference or short-circuit between the touch sensing lines is unavoidable, which undoubtedly reduces the touch recognition efficiency to a large extent.

SUMMARY OF THE INVENTION

According to one embodiment of the invention, a touch display panel is provided. The touch display panel comprises a TFT array substrate having gate lines and an opposite substrate having a black matrix. At least one of the gate lines is used as a touch scanning line, at least one touch sensing line is provided on the black matrix of the opposite substrate, and a touch capacitor is formed at an intersection between the touch scanning line and the touch sensing line.

According to another embodiment of the invention, a display device is provided. The display device comprises the above-mentioned touch display panel.

According to still another embodiment of the invention, a method for determining touch position is provided. The method adopts the above-mentioned touch display panel, and the method comprises: applying a scanning signal to the touch scanning line; detecting a voltage signal output from the touch sensing line; determining the touch scanning line and the touch sensing line that correspond to a touch position according to the detected voltage signal and the scanning signal applied to the touch scanning line; and determining the touch position according to an intersection of the touch scanning line and the touch sensing line that has been determined.

According to the embodiments of the invention, it is unnecessary to specially provide the touch scanning line, and the gate line that is originally formed on the TFT array substrate is used as the touch scanning line. Thereby, the problem that the aperture ratio is reduced by specially adding the touch scanning line on the TFT array substrate in the conventional technology can be avoided.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the invention provides a touch display panel, in which a gate line that is originally formed on the TFT array substrate is used as a touch scanning line so that it is not needed to specially provide the touch scanning line. Thereby, the problem that the aperture ratio is reduced by specially adding the touch scanning line on the TFT array substrate in the conventional technology can be avoided.

Figure 1:
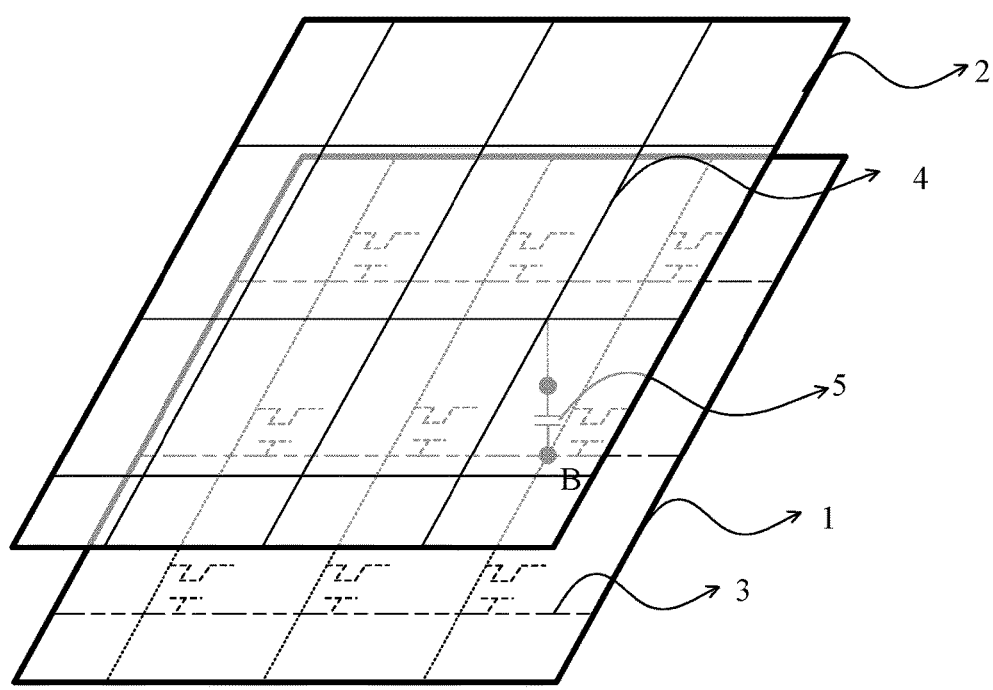
FIG. 1 is a perspective view illustrating a touch display panel according to an embodiment of the invention.

FIG. 1 is a perspective view illustrating the touch display panel according to the embodiment of the invention. As shown in FIG. 1, the touch display panel is formed by bonding a TFT array substrate 1 and an opposite substrate 2. The opposite substrate 2 is, for example, a CF substrate. In the embodiment of the invention, at least one of the gate lines that are originally formed on the TFT array substrate 1 is used as the touch scanning line 3, at least one touch sensing line 4 is provided on a black matrix of the opposite substrate 2, and a touch capacitor 5 is formed at an intersection between the touch scanning line 3 and the touch sensing line 4. Here, the touch scanning line 3 and the touch sensing line 4 are provided on different substrates and intersect with each other. For example, an extending direction of the touch sensing line 4 is perpendicular to an extending direction of touch scanning line 3 (i.e., the gate line).

Figure 2:
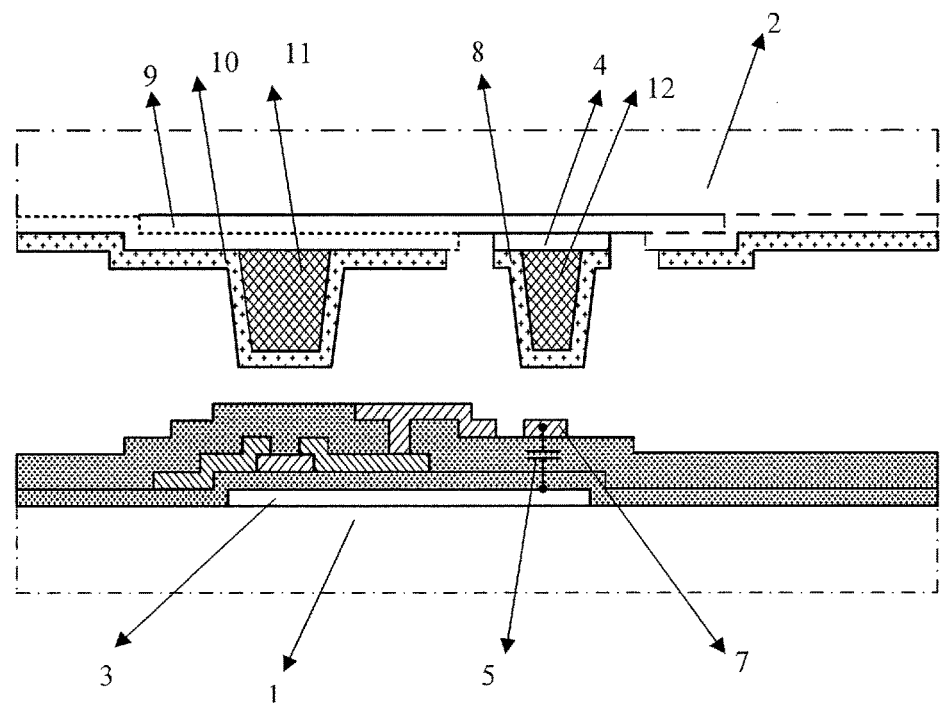
FIG. 2 is a sectional view illustrating the touch display panel according to the embodiment of the invention.

FIG. 2 is a sectional view illustrating the touch display panel according to the embodiment of the invention. As shown in FIG. 2, the touch sensing line 4 is provided on the black matrix 9 which is provided on a lower surface (a surface facing the TFT array substrate 1) of the opposite substrate 2. For example, a first conductive layer 8 is provided on a surface of the touch sensing line 4, and a filler 12 is formed between the first conductive layer 8 and the touch sensing line 4. For example, the first conductive layer 8 and a common electrode 10 on the opposite substrate 2 are made of a same material and formed in a same process. For example, both the first conductive layer 8 and the common electrode 10 on the opposite substrate 2 are made of transparent conductive material, such as, indium tin oxide (ITO), etc. Another filler 11 is further formed on the opposite substrate 2, and the another filler 11 for example is a spacer with a supporting function. For example, the filler 12 and the another filler 11 are made of a same material and formed in a same process. It can be seen from FIG. 2 that, the touch sensing line 4 overlaps with the black matrix 9, is arranged linearly, and perpendicularly intersects with the extending direction of touch scanning line 3 (i.e., the gate line).

The black matrix 9 is made of insulating material, such as, resin material, etc. Thereby, interference or short-circuit between the touch sensing lines 4 can be avoided.

As shown in FIG. 2, a second conductive layer 7 is provided on an upper surface (a surface facing the opposite substrate 2) of the TFT array substrate 1, and the second conductive layer 7 is provided at the intersection between the touch sensing line 4 and the touch scanning line 3. A position of the first conductive layer 8 on the opposite substrate 2 corresponds to a position of the second conductive layer 7 on the TFT array substrate 1. For example, the second conductive layer 7 and a pixel electrode on the TFT array substrate 1 are made of a same material and formed in a same process.

In the embodiment of the invention, only one touch capacitor 5 is formed in one touch region, and one touch region comprises at least one pixel. For example, one touch region comprises a plurality of pixels. In the case that one touch region comprises the plurality of pixels, a certain pixel is selected randomly from the touch region and further a certain sub-pixel is selected randomly from the selected pixel so that the gate line of the selected sub-pixel is used as the touch scanning line 3 and the touch capacitor 5 is formed between the touch scanning line 3 and the second conductive layer 7. For example, the above-mentioned sub-pixel randomly selected is a blue sub-pixel. Since the touch capacitor 5 may affect the aperture ratio, the influence on the optical properties such as luminance can be minimized when the blue pixel is selected.

When the above-mentioned touch display panel is touched, the touch capacitor 5 between the touch scanning line 3 and the second conductive layer 7 at the touch position changes. Due to the change of the touch capacitor 5, the scanning signal transmitted from the touch scanning line 3 to the touch sensing line 4 though the touch capacitor 5 changes as well, and the touch sensing line 4 outputs changed signal as a detection signal so as to determine the touch position. A thickness of the first conductive layer 8 and a thickness of the second conductive layer 7 may be designed according to the practical requirements, so that the first conductive layer 8 and the second conductive layer 7 contact each other at the touch position when the touch display panel is touched. At this time, the scanning signal supplied by the touch scanning line 3 is transmitted to the touch sensing line 4 through the touch capacitor 5, the second conductive layer 7 and the first conductive layer 8.

In addition, in the embodiment of the invention, the reason why one touch capacitor 5 is provided in one touch region comprising the plurality of pixels is as follows. When an object, such as a finger, touches the touch display panel, a pressed region of the touch display panel is relatively large. If one touch capacitor 5 is provided in one touch region comprising one pixel, the pressed region will cover a plurality of the touch capacitors 5, but in practice only one touch capacitor 5 is enough for determining the touch position. Therefore, in the case that one touch capacitor 5 is provided in one touch region comprising one pixel, resources is wasted to a large extent and a relatively large area of the display panel is occupied. Therefore, in the embodiment of the invention, the touch region is designed on the basis of possible pressed region, and for example, one touch region comprises the plurality of pixels.

In order to determine the touch position more accurately, for example, each black matrix 9 on the opposite substrate 2 corresponds to one touch sensing line 4. That is, the number of the touch sensing lines 4 is equal to that of data lines on the TFT array substrate 1, and the positions of the touch sensing lines 4 correspond to the positions of the data lines on the TFT array substrate 1 one by one. Thereby, it can ensure that the touch sensing line 4 overlaps with the data line on the TFT array substrate 1 after the opposite substrate 2 is bonded with the TFT array substrate 1, so that the aperture ratio of the touch display panel is not affected.

An embodiment of the invention further provides a display device comprising the above-mentioned touch display panel. The display device may be a display, a mobile phone, a television, a notebook computer, etc. Other essential components of the display device known by those skilled in the art will not be described herein.

Based on the above-mentioned touch display panel, an embodiment of the invention further provides a method for determining touch position. The method comprises steps as follows.

Step 301: applying a scanning signal to the touch scanning line;

Step 302: detecting a voltage signal output from the touch sensing line;

Step 303: determining the touch scanning line and the touch sensing line that correspond to a touch position according to the detected voltage signal and the scanning signal applied to the touch scanning line;

Step 304: determining the touch position according to an intersection of the touch scanning line and the touch sensing line that has been determined in the Step 303.

For example, the detailed process of the above method is as follows.

1. The touch scanning line 3 (i.e. the gate line) is applied with the scanning signal in a predetermined period, the magnitude of the scanning signal is equal to that of the voltage for turning on the TFT of the sub-pixel. For example, the scanning signal is a clock signal with a predetermined period. For example, the predetermined period is the same as the period of the signal from scanning the pixels row by row. Of course, the predetermined period may be designed according to the practical requirements, as long as it can ensured that normal scanning of the gate line is not affected and the touch is detected in real time.

2. When the touch display panel is touched, the first conductive layer 8 contacts with the second conductive layer 7 within the pressed region, then the scanning signal of the touch scanning line 3 is transmitted to the touch sensing line 4 through the touch capacitor 5.

3. The signal output from the touch sensing line 4 is detected so that the corresponding touch scanning line 3 is determined by taking the clock of the scanning signal applied to the touch scanning line 3 into account, and further the touch position is determined according to the intersection formed by the touch sensing line 4 that outputs the signal and the determined touch scanning line 3.

The foregoing embodiments merely are exemplary embodiments of the invention, and not intended to define the scope of the invention, and the scope of the invention is determined by the appended claims.

What is claimed is:

1. A touch display panel, comprising a thin film transistor (TFT) array substrate having gate lines and an opposite substrate having a black matrix; wherein
    at least one of the gate lines is used as a touch scanning line;
    at least one touch sensing line is provided on the black matrix of the opposite substrate, and the touch sensing line is provided within the region of the black matrix in a display region of the touch display panel;
    a touch capacitor is formed at an intersection between the touch scanning line and the touch sensing line;
    at least one pixel of the touch display panel is formed as a touch region, and the touch capacitor is formed in the touch region; and
    the gate line which corresponds to a blue sub-pixel in a certain pixel in the touch region is selected as the touch scanning line and the touch capacitor of the touch region is only provided in the blue sub-pixel.

2. The touch display panel according to claim 1, wherein the touch sensing line is provided on the black matrix on a lower surface of the opposite substrate; and a first conductive layer is provided on a surface of the touch sensing line.

3. The touch display panel according to claim 2, wherein a second conductive layer is provided on an upper surface of the TFT array substrate, the second conductive layer is provided at the intersection between the touch sensing line and the touch scanning line; and a position of the first conductive layer on the opposite substrate corresponds to a position of the second conductive layer on the TFT array substrate.

4. The touch display panel according to claim 3, wherein the touch capacitor is formed between the touch scanning line and the second conductive layer.

5. The touch display panel according to claim 4, wherein an extending direction of the touch sensing line and an extending direction of the touch scanning line are perpendicular to each other.

6. The touch display panel according to claim 4, wherein each black matrix on the opposite substrate corresponds to one touch sensing line.

7. The touch display panel according to claim 4, wherein a position of the touch sensing line on the lower surface of the opposite substrate corresponds to a position of a data line on the upper surface of the TFT array substrate one by one.

8. The touch display panel according to claim 2, wherein a filler is formed between the first conductive layer and the touch sensing line.

9. A display device, comprising the touch display panel according to claim 1.

10. The display device according to claim 9, wherein the touch sensing line is provided on the black matrix on a lower surface of the opposite substrate; and a first conductive layer is provided on a surface of the touch sensing line.

11. The display device according to claim 10, wherein a second conductive layer is provided on an upper surface of the TFT array substrate, the second conductive layer is provided at the intersection between the touch sensing line and the touch scanning line; and a position of the first conductive layer on the opposite substrate corresponds to a position of the second conductive layer on the TFT array substrate.

12. The display device according to claim 11, wherein the touch capacitor is formed between the touch scanning line and the second conductive layer.

13. The display device according to claim 12, wherein an extending direction of the touch sensing line and an extending direction of the touch scanning line are perpendicular to each other.

14. The display device according to claim 12, wherein each black matrix on the opposite substrate corresponds to one touch sensing line.

15. The display device according to claim 12, wherein a position of the touch sensing line on the lower surface of the opposite substrate corresponds to a position of a data line on the upper surface of the TFT array substrate one by one.

16. The display device according to claim 10, wherein a filler is formed between the first conductive layer and the touch sensing line.

17. A method for determining touch position, employing the touch display panel according to claim 1, wherein the method comprises:
    applying a scanning signal to the touch scanning line;
    detecting a voltage signal output from the touch sensing line;
    determining the touch scanning line and the touch sensing line that correspond to a touch position according to the detected voltage signal and the scanning signal applied to the touch scanning line; and
    determining the touch position according to an intersection of the touch scanning line and the touch sensing line that has been determined.

* * * * *